March 29, 1960 — J. POS — 2,930,125
DENTAL DEVICES AND THEIR METHODS OF PRODUCTION
Filed Dec. 24, 1958 — 2 Sheets-Sheet 1
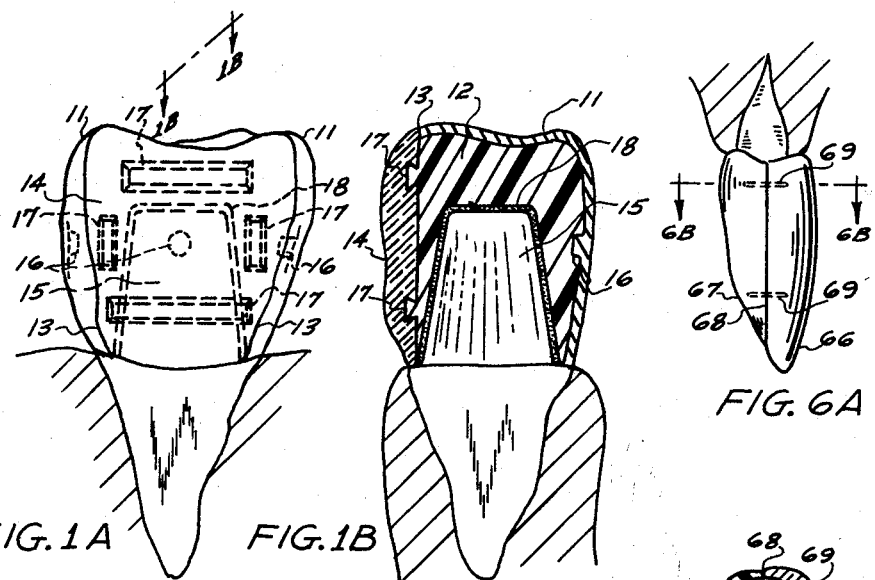
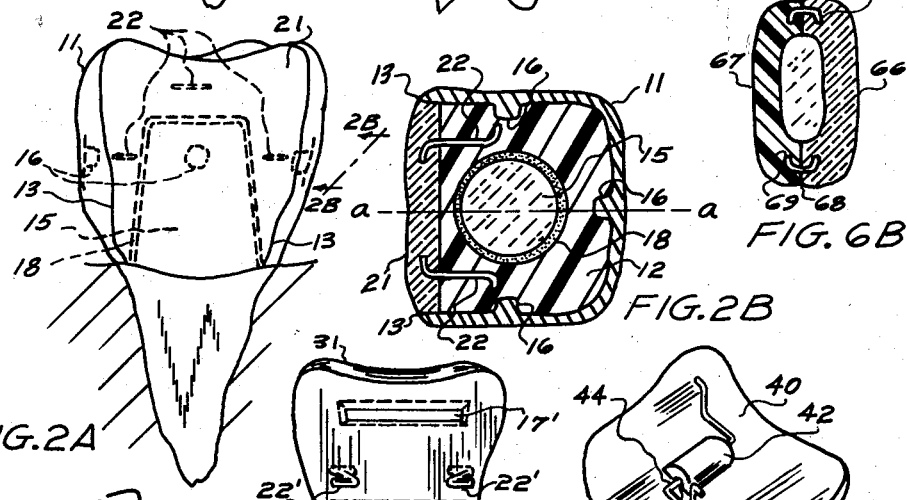
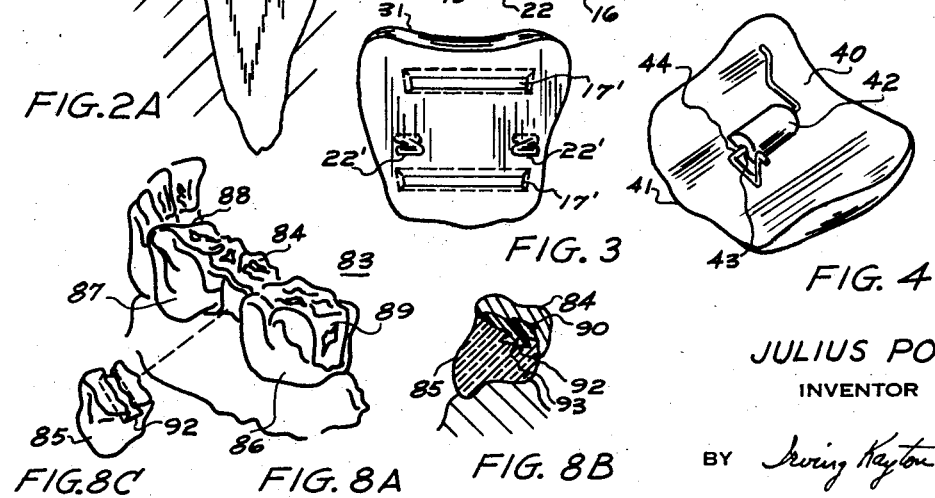
JULIUS POS
INVENTOR
BY *Irving Kayton*
ATTORNEY March 29, 1960     J. POS     2,930,125
DENTAL DEVICES AND THEIR METHODS OF PRODUCTION
Filed Dec. 24, 1958     2 Sheets-Sheet 2

JULIUS POS
INVENTOR

BY *Irving Kayton*
ATTORNEY

United States Patent Office 2,930,125
Patented Mar. 29, 1960

2,930,125

DENTAL DEVICES AND THEIR METHODS OF PRODUCTION

Julius Pos, Blauvelt, N.Y., assignor of ten percent to Irving Kayton

Application December 24, 1958, Serial No. 782,971

19 Claims. (Cl. 32—12)

This invention relates to dental devices and more particularly to dental crowns and replacement teeth wherein the device has an esthetic as well as utilitarian function.

High fusing porcelain has properties, such as color, glaze and translucence, which simulate that of the human tooth to such an excellent degree that it has long been considered the best material known for esthetic dental simulation. However, certain other of its properties such as, for example, the brittleness accompanying its excellent hardness, the extremely high temperature of its fusing point when used with low melting point metals, and its very translucence when used as a veneer over a metal, have resulted in the practical unsuitability of this esthetically excellent material for many dental applications. Furthermore, where it has been otherwise reasonably physically possible to use this material, it has often been the case that the cost involved has been prohibitive due to the inordinate amount of labor involved or extra equipment or parts required, or both.

In accordance with the present invention, however, high fusing porcelain can now be used less expensively, more efficiently, and to better esthetic advantage than has heretofore been possible. Most importantly, it can be used in certain dental applications wherein heretofore it was not possible so to do, irrespective of the time and effort that the technician or dentist was prepared to expend. By way of example, let us consider certain specific instances wherein the principles of the invention may be advantageously applied.

Until the advent of the plastic veneer shell crown, disclosed in my copending application, Serial Number 703,867, filed December 19, 1957, there had never been a shell crown with a veneer having promise of commercial success. Until now, there has never been a shell crown with any type of porcelain veneer, whether of high or low fusing porcelain.

It is an object of this invention, therefore, to provide a shell crown with a porcelain veneer; and it is a specific feature of the invention that the porcelain is high fusing.

A technic is known in the art whereby it is possible to mount a low fusing porcelain veneer on the labial surface of a gold cast crown. The low fusing porcelain veneer is secured to the gold labial surface of the crown by means of gold pin or wire loops already secured to the labial face of the crown. The technic has involved mounting the veneer upon the crown by baking the porcelain veneer onto the gold pins. Of necessity, the porcelain used in such a technic has to be low fusing since the melting point of gold, although higher than the fusing point of low fusing porcelain (about 1700° F.), is less than that of high fusing porcelain (about 2400° F.). Consequently, such a veneer cracks more readily than would one made of the much harder high fusing porcelain. Furthermore, the veneer of necessity must be quite thin in order to be mounted on the labial surface of the crown without bulging out too far and thus destroying the fidelity of simulation of the labial surface of the crown. Not only is a thin veneer more readily susceptible to cracking, but it results in an esthetic problem. With a thin veneer, the carefully selected color of the porcelain is optically contaminated by the color of the gold partially visible therethrough, resulting in a change in the shading of the translucent veneer material.

It is another object of this invention to provide a gold cast crown with a high fusing porcelain veneer. Important features of the invention are that the veneer may be made thicker than heretofore possible and does not have a gold backing. These features each result in the advantage of excellent color matching capacities.

Although cast crowns are known in the art composed of alloys whose melting properties are such that a high fusing porcelain veneer may be used therewith, the veneer must nevertheless be quite thin since it must be mounted on the metal of the crown. Thus the problems of color matching and susceptibility to cracking of the veneer remain even with these crowns; in addition a considerable increase in cost is introduced due to the complicated technic required to produce and repair the crown. Furthermore, the baking of the high fusing porcelain upon the metal crown at the required temperature of 2400° F. may result in undesired shrinkage of the metal.

It is therefore an additional object of this invention to provide an inexpensive high fusing porcelain veneer cast crown eliminating the problem of shrinkage.

The use of high fusing porcelain is well established in the art for replacement teeth. Thus in most bridges, steele facing and true pontic teeth are made of high fusing porcelain. A steele facing tooth, as is known in the art, comprises a metallic backing vertically disposed and forming the lingual surface of the replacement with a porcelain facing mounted thereon. However, the device used for such mounting is a long deep undercut groove in the porcelain facing, running down the center thereof from the gingival margin almost to the incisal edge. Down the middle of the metallic backing, also running from the gingival margin to the incisal edge, a metallic elevation is formed shaped to fit the undercut groove of the facing. In practice, the facing is mounted upon the backing by sliding the facing vertically along the backing such that the elevation of the backing slides inside the groove of the facing. The two parts are thus secured to each other by virtue of the undercuts of the groove and elevation; they are held together by cement. However, since the groove in the porcelain facing is necessarily vertical and quite deep, the strength of the porcelain facing is decreased. With continued mastication the metallic backing may expand. Since the porcelain facing cannot accommodate itself to the forces resulting from the expansion, the facing often cracks. Furthermore, saliva in the mouth has fairly ready access to the cement in the union. All these factors tend to increase the frequency of repair and replacement required of the porcelain facing.

True pontic replacements are similar to steele facing replacements but differ in that the plane of major contact between the porcelain element and the metallic backing, and thus of the groove and meshing elevation, rather than being vertical as in the steele facing extends approximately horizontally in the true pontic tooth. The metallic backing of the true pontic tooth forms the occlusial surface of the replacement tooth. True pontic replacement teeth are difficult to repair because of the precise requirements for fitting the replacement tooth to the alveolar ridge.

It is therefore another object of the present invention to provide improved replacement teeth wherein the union of the porcelain and metallic elements is not susceptible to loosening due to the chemical action of saliva and wherein the strength of the porcelain element and its resistance to cracking is greater than has heretofore been possible.

All of the above objects, features and advantages are accomplished by, and realized in, structures in accordance with the principles of the invention. In accordance with the invention a porcelain element may be immovably fixed relative to a metallic member through a plastic intermediary to which each is secured. Consider a metallic member having one or more undercuts in a face thereof with plastic filling the undercuts and covering a portion of the face of the metallic member, or having one or more metallic projections such as pins or wires secured to a face thereof with plastic surrounding and engaging the pins or wires (which may be bent so as to hold the plastic firmly), or having both the undercuts and the wires. Consider also a porcelain element having one or more undercuts in one face thereof which are filled with plastic, or having one or more metallic pins or wires fused into the porcelain with plastic surrounding and engaging them, or having both. The metallic member may be rigidly secured to the porcelain element by pressing the plastic which is attached to the metallic member forcefully against the plastic which is attached to the porcelain member. Dental plastic is characterized in that joining may be accomplished by pressure whereby the two portions of plastic merge with each other to form one homogeneous substance where the joint would be, ordinarily. Alternatively, a coat of plastic in its liquid or soft state may be applied to the plastic secured to the porcelain element; the soft plastic coat is then brought in contact with the plastic portion of the metallic member and held there until the soft plastic has dried (a matter of a few minutes). By this method also the joining region becomes a homogeneous substance. Since the porcelain element was firmly secured to its plastic portion by virtue of the undercut or wires, or both, therein, and the metallic member was likewise firmly secured to its plastic portion by the same mechanism, the element and member are now rigidly secured to each other through the plastic intermediary.

In one application of the invention, hereinafter to be described in greater detail, the principles of the invention are applied to veneer crowns wherein the metallic member is a shell or a cast crown with its labial surface having a cut-out and its plastic portion is a layer within the crown which may occupy at least a part of the area of the cut-out, but preferably all of the area. The porcelain element is a labial veneer or facing with a layer of plastic secured to its back face and whose shape is substantially the same as the cut-out of the crown into which it fits. By merging the plastic layers of the porcelain veneer and the crown, the veneer is rigidly affixed to the crown.

It may be seen that in this embodiment the porcelain veneer may be high fusing and may be secured to a crown of any type of metal. The shading or color of the porcelain does not change since it is mounted directly on a white plastic (which may also be color matched) rather than on metal. In addition, the veneer or facing may be made quite thick since it can occupy a portion of the inside of the crown, i.e. it may be partially recessed in the cut-out of the crown, and thus need not extend excessively in an outward direction. Furthermore, this arrangement provides two considerable but heretofore unmentioned advantages. Firstly, the forces applied to the porcelain veneer in the mouth during ordinary use are partially absorbed by the plastic backing which has more "give" than does the porcelain. This results in less likelihood of the veneer cracking than would be the case if it were mounted directly on metal which is more rigid. Secondly, in case the veneer does crack, replacement is a simple process which may even by performed directly in the patient's mouth. Thus, a new veneer with a plastic backing therein may be applied to the crown either by pressure, or by applying a coat of liquid or soft plastic and holding it in place until solid.

In another application of the invention, hereinafter to be described in greater detail, the principles of the invention are applied to porcelain replacement teeth, particularly in bridges, wherein the metallic member is the backing portion of the bridge and the porcelain element is a replacement tooth or facing. The plastic portions on the porcelain facing and metallic backing merge to form a single plastic layer between the two, thereby rigidly securing each to the other.

In addition, the principles of the invention are applied in another way, hereinafter to be described in greater detail, to a porcelain jacket crown wherein a portion of the lingual face of the porcelain crown is replaced by a plastic portion with the porcelain and plastic portions secured to each other by the holding effect of thin metallic wires fused into the porcelain and pressed or dried into the plastic. In such an arrangement the bite is such that the opposing teeth meet the plastic portion rather than the porcelain part of the jacket-crown. Thus the great pressures involved in mastication are not applied to the porcelain, thereby reducing the possibility of its cracking.

Methods for producing dental devices in accordance with the principles of the invention will also be described.

Other objects, features and advantages of the invention will be more fully understood by reference to the following detailed description considered together with the accompanying drawings. In the drawings:

Figures 1A and 1B are perspective and vertical cross-sectional views, respectively, of a porcelain veneer shell crown in accordance with the invention, wherein the veneer has securing undercuts;

Figures 2A and 2B are perspective and horizontal cross-sectional views, respectively, of a porcelain veneer shell crown in accordance with the invention, wherein the veneer has securing wires;

Figure 3 is a porcelain veneer which has both securing undercuts and wires for alternative use with the shell crowns of Figures 1A through 2B;

Figure 4 is a modified form of the porcelain veneer of Figure 3;

Figures 6A and 6B are perspective and horizontal cross-sectional views respectively, of a jacket crown in accordance with the invention;

Figure 7A:
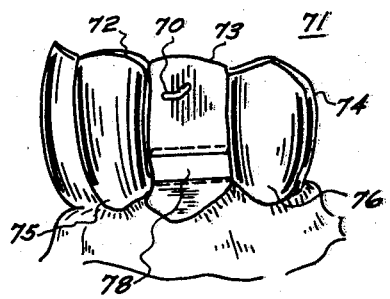
Figure 7C:
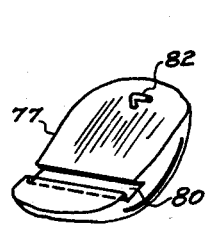
Figure 7B:
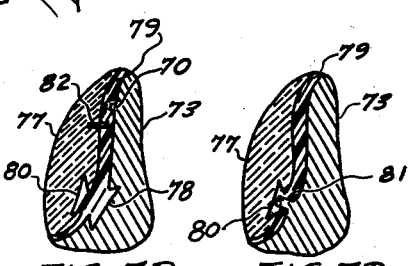
Figure 7D:
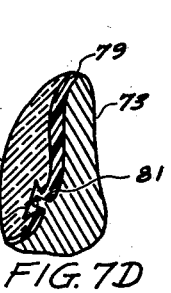

Figures 7A, 7B, and 7C are perspective and cross-sectional views of a replacement tooth in a bridge in accordance with the principles of the invention; Figure 7D shows an alternate way of securing the replacement tooth to the bridge; and Figures 8A, 8B, and 8C are perspective and cross-sectional views of another type of replacement tooth in another type of bridge in accordance with the principles of the invention.

Considering Figures 1A through 2B in greater detail, a porcelain veneer crown in accordance with the principles of the invention, is disclosed by way of example solely for purposes of illustration, wherein a metallic shell crown 11 with a plastic layer 12 therein has a cut-out 13 in its labial face into which fits the porcelain veneer or facing 14. The metallic shell crown 11 may be, for example, of gold, silver or aluminum. The whole crown assembly is mounted upon a prepared tooth 15 with the plastic layer 12 of the crown cemented to the prepared tooth 15 with a layer of dental cement 18. Plastic layer 12 is secured to the crown by virtue of the metallic projections 16 extending from the inside faces of shell crown 11, which may be small pins or wires of metal similar to that of shell crown 11, as disclosed in my above mentioned copending application. The porcelain veneer 14, which is preferably of high fusing porcelain, is secured to the plastic layer 12 by virtue of the four undercuts 17 in the back of the veneer 14 as shown in Figures 1A and 1B. Alternatively, a veneer 21 may be secured to the plastic layer 12 by the bent metallic wires 22 as shown in Figures 2A and 2B or by a veneer 31 which may have a combination of undercuts 17' and wires 22' as shown in Figure 3. Although the wires 22 and 22' may be secured to any convenient portion of the veneers 21 and 31, respectively, to be in turn secured to the plastic layer 12 in the cut-out region 13 of the crown 11, a preferred disposition of the wires does exist. When viewing the crown 11 along the line a—a in Figures 2A and 2B, through the labial and lingual faces, it may be noted that between the mesial surfaces of the prepared tooth 15 and the shell 11, and between the distal surfaces of the prepared tooth 15 and shell 11, the plastic 12 extends all the way from the lingual to labial faces without any obstructions. This is also true of the incisal portions of the crown and prepared tooth. With wires 22 disposed in the veneer 21, as indicated, so that they coincide with these unobstructed regions in plastic 12, the wires may penetrate very deeply into the crown 11 and therefore into plastic 12, as shown in the horizontal cross-section view, Fig. 2B. This arrangement provides an especially strong anchorage for the wires 22 and thus an especially strong union of veneer 21 to plastic 12 and consequently to the crown 11.

The undercuts of the embodiments of Figures 1A, 1B and 3, may be of any convenient shape. As shown in these embodiments, solely by way of example, long grooves in the broad face of the veneers 14 and 31 are used, with the width of the grooves increasing with depth from the surface, when viewing a cross-section thereof (as seen in Fig. 1B).

In another alternative mechanism for securing the veneer to the crown, wires may be combined with an undercut as shown in Fig. 4. Here the back face 40 of the veneer 41 is built up with porcelain to form a mound 42 with a hole 43 running parallel to the broad face of veneer. Through hole 43, which effectively serves as an undercut, is run a wire 44. Each end of wire 44 is bent so as to coincide in location with the preferred unobstructed plastic portions inside the crown as discussed above. A multitudinous variety of undercut and wire or pin geometries may be utilized in accordance with the principles of the invention.

We may now consider a method of producing a porcelain veneer shell crown such as is depicted in Figs. 1A through 2B but having the veneer 31 of Fig. 3 wherein both undercuts and wires are used, rather than the veneers 14 or 21. With the exception of the porcelain veneer 31 with its undercuts 17' and wires 22' attached thereto, the shell crowns disclosed in Figs. 1A through 2B are substantially the same as the plastic veneer crown disclosed in my above-mentioned copending application. Accordingly, methods for producing the crown are also basically similar with only certain additional distinguishing steps. One of the methods described in my copending application will now be briefly presented with the steps peculiar to the porcelain veneer aspect added appropriately (a detailed description of the method for producing the plastic veneer crown may be obtained by reference to my copending application). The method now to be described will hereinafter be called the "flasking method."

A metallic shell crown is selected close to the size of the prepared tooth. In order to determine whether or not the selected shell crown is suitable for a particular tooth to be crowned, it is necessary to check the occlusion and all the contact points with adjacent teeth and also the crown must follow the gingival margin. A layer of wax is then inserted into the crown, the prepared tooth is lubricated and the crown is fitted over the prepared tooth; the crown is removed after hardening of the wax, with the wax mold in the crown having an impression of the prepared tooth therein. Die material is placed into the crown, which after hardening provides a reproduction of the prepared tooth due to the wax mold. The die and crown are separated by boiling the wax away. Then a portion of the labial surface of the metallic shell crown is cut out. The shape of the cut-out is made to conform to the outline of the porcelain veneer or facing that is to be secured to the crown. The porcelain veneer has plastic secured to its back face by one or more undercuts, wires, or both as in Fig. 3. Since the veneer may well go right to the gingival margin, the cut-out may eliminate all the metal of the shell along the gingival margin on the labial surface. The die is then lubricated. Wax is placed inside the crown and the crown pressed onto the die. The wax within the crown is now visible through the cut-out portion. The wax visible through the cut-out is scraped away until the porcelain veneer which fits into the recessed region of the cut-out provides a labial surface for the crown which does not extend excessively outwardly, but rather conforms to the plaster impression having been previously made, in a manner well known in the art, of the tooth to be replaced and its adjacent teeth. With the wax properly recessed and contoured the thus prepared crown with the porcelain veneer in place is inserted into one part of a two-part flask, which has been filled with stone plaster. After the stone plaster is hardened in said one part of the flask, the surface of the stone plaster is lubricated and then the second part of the two-part flask is set upon the one part of the flask and filled with stone plaster, thereby forming a reproduction of the inner face of the crown, and thereby of the prepared tooth. After the stone plaster in the second part of the flask has hardened, the two parts of the flask are separated and the wax is boiled out of the crown. A coat of plastic liquid is applied to the plastic of the porcelain veneer. Plastic is then placed in the crown to replace the wax. The two parts of the flask are pressed against each other and cured until the plastic hardens into precisely the same shape as the wax mold which it replaced and is formed homogeneously with the plastic on the back of the porcelain veneer. The plastic is permanently secured to the shell crown by virtue of the internal metallic projections in the crown discussed above. The two parts of the flask are then separated and the veneer crown removed. The veneer crown is placed over the actual prepared tooth and cemented in place.

The porcelain veneer or facing may be provided with undercuts, such as in Figures 1A, 1B and 3, either by making provision for them when the veneer is originally manufactured, or by drilling the undercuts therein in an already manufactured veneer or facing. Similarly, wires or pins, such as in Figures 2A, 2B and 3, may be secured in the veneer or facing during the original manufacture. In the case of an already manufactured veneer or facing, porcelain in its powder form may be placed at selected spots on the back face of the veneer, and a wire may be placed in the powdered porcelain at each spot; then the entire veneer may be baked in an oven until each porcelain spot is fused to the veneer with a wire embedded therein.

The plastic may be effectively secured to the porcelain veneer in the undercuts and/or engaged with the wires by filling the undercuts, or surrounding the wires, with plastic in its liquid or soft state, and then baking the plastic at 160° F. for one hour. It is recommended that those surfaces of the porcelain be roughened at which plastic is to be secured in order to provide a better grip. Any of the well known dental plastics may be used in accordance with the principles of the invention. Acrylic resins, for example, as disclosed in U.S. Patent 2,120,006 are an appropriate class of plastics.

In my above mentioned copending application a second method of producing a plastic veneer shell crown is disclosed requiring fewer steps than the flasking method described above. When appropriate, this second method may be used for producing a porcelain veneer shell crown in accordance with this invention by adding additional steps appropriate to the porcelain veneer feature in manner analogous to the steps added to produce the flasking method described above.

Thus far the principles of the invention have been shown as applied to shell crowns. But they are readily applied to cast crowns and from an economic viewpoint a high fusing porcelain veneer is more likely to be used in conjunction with a cast crown than with the less expensive shell crown.

In principle, the porcelain veneer cast crown is similar to the porcelain veneer shell crown described above, with the differences that a cast crown is used rather than a shell crown and as a consequence an undercut may be used in the cast crown itself in lieu of, or in addition to, metal projections, for permanently securing the plastic layer to the internal portion of the cast crown.

Figure 5A:
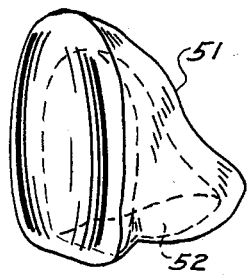
Figure 5A is a wax mold for a cast crown.
Figure 5B:
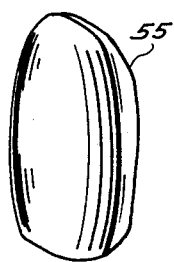
Figures 5B and 5C are front and rear views respectively of a porcelain veneer to be used with a cast crown in accordance with the invention.
Figure 5C:
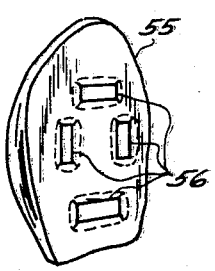
Figure 5D:
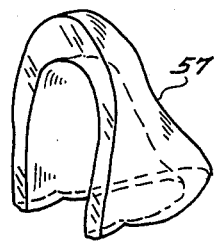
Figure 5D is the wax mold of Figure 5A with the labial face cut out, in accordance with the invention.
Figure 5E:
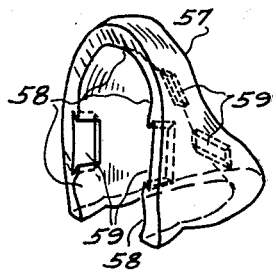
Figure 5E is the wax mold of Figure 5D with portions of the inner faces thereof removed in accordance with the invention.

Referring now to Figures 5A through 5G, a method for producing a high fusing porcelain veneer cast crown will be described. A hard wax mold 51 of the tooth to be replaced, with a cavity 52 therein corresponding to the prepared tooth 53 (shown in Fig. 5G) is prepared by the dentist in manner well known in the art. A ready made porcelain veneer or facing 55 with undercuts 56 as in Figures 5B and 5C (which respectively show front and back views of veneer 55) is then placed against the labial face of the wax mold 51 and a cutout is made in the labial wall of the wax mold conforming to the outline of the porcelain veneer resulting in mold 57 of Fig. 5D. The veneer 55 itself should be somewhat thinner than the labial wall removed from the wax mold, but the total thickness of veneer 55 and its plastic backing 62 (not shown in Fig. 5C but visible in Fig. 5G) which fills undercuts 56 is equal to the wax labial face removed from the wax mold 57. Wax is then scraped off the inside of the wax mold 57 along the occlusial, mesial and distal faces to provide the recessed regions 58 as shown in Fig. 5E. It is only necessary to remove the wax from one of those faces, but it may be removed from all three and also from the lingual face. In so scraping the wax mold, at least one undercut 59 should be made in at least one of the faces, but preferably two or more undercuts 59 should be made and preferably in two or more of the faces. The volume of the wax thus removed from these faces constitutes the volume later to be occupied by the plastic layer inside the cast crown.

Figure 5F:
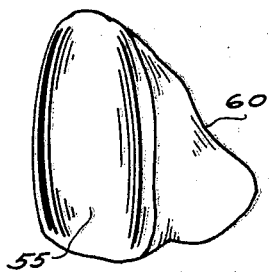
Figures 5F and 5G are perspective and cross-sectional views respectively of a high fusing porcelain veneer gold cast crown which utilized the devices of Figures 5A through 5F in its preparation.
Figure 5G:
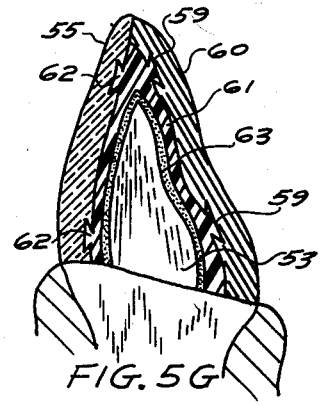

From the remaining wax mold a gold crown 60, Fig. 5F, is cast and polished in manner well known in the art. The veneer 55 is placed in its proper position relative to the cast gold base 60 as shown in Fig. 5F. They are then processed by the remaining part of the flasking method described above, to produce the unified porcelain veneer gold cast crown shown in vertical cross-section in Fig. 5G. Thus the plastic backing 62 of veneer 55 is merged with the plastic 61 which is secured to the gold crown base 60 by virtue of its filling undercuts 59. The entire veneer crown assembly is then cemented onto prepared tooth 53 with a coat of cement 63.

Although, as described the cast crown is, so to speak, built around a given porcelain veneer, the reverse may be desired, i.e., the veneer may be made to conform to the crown. Thus when the wax mold is ready to have its labial surface cut out, the shape of the cut-out may be made in accordance with esthetic factors or even arbitrary considerations. After removing the wax from the wax mold to form the desired labial cutout, the remainder of the mold is placed on the die reproduction of the prepared tooth. Platinum foil is placed over the cut-out and pressed against the mold and die to obtain a matrix of the cut-out and thus of the veneer desired. The matrix is then invested, powdered porcelain placed upon the matrix, and the entire combination placed in an oven to bake the porcelain in manner well known in the art until it properly fuses. Provision may be made in the matrix for providing an undercut in the back of the porcelain veneer or for locating thin wires or pins. With the porcelain veneer made in this way it must of necessity fit perfectly in its outline to the contour of the cut-out in the cast crown. The veneer is then secured to the crown in the manner described above.

Having described shell and cast veneer crowns, the last crown to be considered by way of example to illustrate the principles of the invention, is the porcelain jacket crown.

In Figures 6A and 6B there is disclosed in perspective and horizontal cross-section, respectively, a jacket crown the major portion of which is porcelain and the remainder plastic. The porcelain portion 66 of the jacket crown comprises the labial face and incisal edge and may be obtained either by actually grinding off a portion of the lingual face of a complete jacket crown or else a porcelain jacket crown may be manufactured with the lingual portion missing. The lingual portion 67 of the crown is plastic. Along the edges 68 wherein the porcelain and plastic portions 66 and 67 of the crown meet, there are four metallic wires 69 each one of which has an end secured in a porcelain edge and each having an end secured in a plastic edge. Preferably each end of the wires 69 is bent to provide a secure grip on its portion of the crown. It may be noted that the plastic portion 67 occupies that region of the crown whereat the incisal edge of the opposing tooth strikes. For this reason, the porcelain 66 is spared the shock of this contact and the probability of the porcelain jacket cracking is reduced.

All of the embodiments of the figures heretofore described relate to dental crowns in accordance with the principles of the invention. In the following figures the embodiments are bridges having replacement teeth secured thereto in accordance with the principles of the invention.

In Fig. 7A there is disclosed a bridge 71, preferably of gold, with the metallic backing thereof forming three lingual faces 72, 73 and 74 secured to two teeth 75 and 76 by three-quarter crown backings 72 and 74. The middle portion 73 of the bridge 71 is cast in accordance with a porcelain replacement tooth or facing 77. A vertical cross-section of porcelain facing 77 in its adjacent relation to its backing portion 73 is shown in Fig. 7B. The back face of facing 77, i.e., the face adjacent backing 73 is shown in Fig. 7C. Porcelain facing 77 has an undercut 80 located in its gingival half which extends from its mesial to distal edges; a metallic securing pin 82 is located in its incisal half. The backing 73 is similar to a steele-backing except that the vertical securing elevation is absent. Instead the backing has an undercut 78 which is disposed so as to register with the undercut 80 of facing 77. In its incisal half backing 73 has a securing pin 70. Between porcelain facing 77 and backing 73, and securing them to each other, is a plastic layer 79 filling undercuts 78 and 80 and surrounding securing pins 70 and 82. The plastic 79 may be applied in any of the ways heretofore described.

An alternative securing structure, as shown in vertical cross-section in Fig. 7D, for the backing 73 in lieu of its undercut 78 filled with plastic, is a metallic rod 81 secured horizontally to backing 73 and extending from the mesial to distal edges and registering relative to undercut 80 of facing 77 so as to fit inside undercut 80.

Such a rod may have grooves along its length to provide retention relative to plastic 79 within undercut 80.

In Fig. 8A there is disclosed a bridge 83, preferably of gold, with the metallic portion 84 thereof forming the occlusial and part of the lingual faces for a replacement tooth, and secured to two teeth 86 and 87 by inlays 88 and 89. The middle portion 84 is cast in accordance with a porcelain replacement tooth 85. Replacement tooth 85 is shown in Fig. 8C, and in Fig. 8B in vertical cross-section in its adjacent relation to gold bridge portion or backing 84. Replacement tooth 85 has an undercut 92 located on its occlusial surface which extends from its mesial to distal edges. The backing 84 is similar to a true pontic backing except that there is no metallic elevation extending in the labial to lingual direction for mounting the replacement tooth. Instead backing 84 has an undercut 90 disposed so as to register with the undercut 92 of tooth 85. Between the occlusial surfaces of tooth 85 and backing 84 and securing them to each other, is a plastic layer 93 filling undercuts 90 and 92. The plastic layer may be applied in any of the ways heretofore described.

Alternate securing structures may be used such as a rod with grooves therein fitting into the plastic filled undercut of the porcelain. Such an arrangement was shown above in Fig. 7D, but is also applicable to a bridge such as in Figures 8A through 8C. Another type securing structure may be obtained by putting undercuts in the mesial and distal surfaces (near the occlusial surface) of both the replacement tooth 85 and backing 84 in lieu of the undercuts 90 and 92.

It should be noted that in any of the embodiments heretofore disclosed, an undercut may be replaced by an appropriate metallic projection for securing the plastic to the metal or porcelain; and the projection may be replaced by an undercut. An exception to the latter substitution is in the case of the shell crown when the metal is too thin to properly provide an undercut therein.

It is to be understood that the above described arrangements are merely illustrative of the principles of the invention. Numerous other arrangements may be devised by those skilled in the art without departing from the spirit and scope of the invention.

What I claim is:

1. A dental member for use in the mouth comprising in combination a metallic element having a given melting point; a porcelain element having a fusing point greater than said melting point; and means for maintaining said elements in fixed and adjacent spatial relation to each other, said means comprising a plastic element disposed contiguous to each of said elements.

2. A dental member as recited in claim 1 including a first means for securing said porcelain element to said plastic element and a second means for securing said metallic element to said plastic element.

3. A dental member as recited in claim 2 wherein said first securing means comprises a thin metallic element with a portion of said thin metallic element encased in said plastic element and a different portion of said thin metallic element fused into said porcelain element.

4. A dental member as recited in claim 2 wherein said second securing means comprises a thin metallic element with a portion of said thin metallic element encased in said plastic element and a different portion of said thin metallic element contiguous to and in fixed rigid relation to said metallic element.

5. A dental member as recited in claim 2 wherein said second securing means comprises an undercut in said metallic element with a portion of said plastic element filling said undercut.

6. A dental member as recited in claim 2 wherein said first securing means comprises an undercut in said porcelain element with a portion of said plastic element filling said undercut.

7. A dental member as recited in claim 2 wherein said second securing means comprises a physical irregularity on a surface of said metallic element, said irregularity being contiguous to a portion of said plastic element.

8. A combination comprising a high fusing porcelain labial veneer fixedly secured to a gold crown wherein said veneer and said crown are mutually contiguous to a plastic portion.

9. A porcelain element for dental use, a plurality of thin metallic wires spaced apart with a portion of each of said wires secured in a portion of said porcelain element, and a plastic element disposed contiguous to said porcelain element and encasing a different portion of each of said wires.

10. A combination as recited in claim 9 wherein said porcelain element is at least the labial part of a jacket crown, the plastic element is at least a portion of the lingual part of a jacket crown, and said wires are secured in the mesial and distal edges, respectively of said porcelain element.

11. A porcelain element conforming to the shape of a portion of a tooth, said element having an undercut in a face thereof, and plastic filling said undercut.

12. A hollowed metallic element conforming to the shape of a portion of a tooth, said metallic element having an undercut in the inner face thereof, and plastic filling said undercut.

13. A combination comprising a hollow metallic crown having a cut-out in its labial surface, a plastic layer secured to the inner face of said hollow crown, a porcelain veneer formed to simulate the labial surface of a tooth, and means for securing said veneer to said plastic layer.

14. A combination as recited in claim 13 wherein said cut-out extends down to and includes a portion of the gingival edge of said crown and the boundary of said porcelain veneer conforms substantially to the boundary of the cut-out.

15. A combination as recited in claim 13 wherein said securing means comprises an undercut in said veneer.

16. A combination as recited in claim 13 wherein said securing means comprises a metallic element baked into said veneer and extending into said plastic layer.

17. A combination comprising a metallic shell crown, a plastic element mounted upon said crown, and a porcelain veneer mounted upon said plastic element relative to said shell crown to form the labial face thereof.

18. A method of producing a dental cast crown having a porcelain veneer for a prepared tooth comprising the steps of casting a metallic crown with a cut-out therein; placing a plastic material within said cast crown and conforming said plastic in conjunction with the inner face of said cast crown to the shape of the prepared tooth; securing to said plastic material within the cut-out region a porcelain veneer having an outline conforming to the outline of said cut-out; and securing said dental crown to said prepared tooth.

19. A replacement tooth comprising a metal backing; a porcelain replacement tooth portion; and plastic material between said backing and said porcelain portion and contiguous to both; and a physical irregularity in said backing and in said porcelain portion for securing said plastic material thereto.

References Cited in the file of this patent

UNITED STATES PATENTS

| | | |
|---|---|---|
| 1,218,779 | Crate | Mar. 13, 1917 |
| 2,031,996 | Zelesnick | Feb. 25, 1936 |
| 2,700,822 | Infante | Feb. 1, 1955 |
| 2,744,326 | Chaiken et al. | May 8, 1956 |